US006335983B1

(12) United States Patent
McCarthy et al.

(10) Patent No.: US 6,335,983 B1
(45) Date of Patent: *Jan. 1, 2002

(54) REPRESENTING AN EXTENDED COLOR GAMUT DIGITAL IMAGE IN A LIMITED COLOR GAMUT COLOR SPACE

(75) Inventors: Ann L. McCarthy, Pittsford; Kevin E. Spaulding, Spencerport; Edward J. Giorgianni, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/162,051

(22) Filed: Sep. 28, 1998

(51) Int. Cl.$^7$ ................................................. G06K 9/00
(52) U.S. Cl. ........................................ 382/162; 358/523
(58) Field of Search ................................. 382/162–167, 382/305, 249; 358/504–518, 520, 523, 1.9; 348/431.1, 434.1; 345/153, 155

(56) References Cited

U.S. PATENT DOCUMENTS

| | | | |
|---|---|---|---|
| 4,417,270 A | | 11/1983 | Nagao et al. |
| 4,903,317 A | | 2/1990 | Nishihara et al. |
| 5,050,230 A | | 9/1991 | Jones et al. |
| 5,122,873 A | | 6/1992 | Golin |
| 5,268,754 A | * | 12/1993 | Van De Capelle et al. . 358/527 |
| 5,297,219 A | | 3/1994 | Weldy |
| 5,317,425 A | * | 5/1994 | Spence et al. ............... 358/504 |
| 5,333,069 A | * | 7/1994 | Spence ........................ 358/517 |
| 5,510,910 A | * | 4/1996 | Bockman et al. ........... 358/502 |
| 5,528,377 A | | 6/1996 | Hutcheson |
| 5,539,540 A | | 7/1996 | Spaulding et al. |
| 5,583,665 A | | 12/1996 | Gregory, Jr. et al. |
| 5,583,666 A | | 12/1996 | Ellson et al. |
| 5,666,215 A | | 9/1997 | Fredlund et al. |
| 5,713,062 A | * | 1/1998 | Goodman et al. ............. 399/49 |
| 5,760,386 A | * | 6/1998 | Ward ........................... 235/493 |
| 5,892,891 A | | 4/1999 | Dalal et al. |
| 5,949,967 A | * | 9/1999 | Spaulding et al. ............ 358/1.9 |
| 5,990,931 A | | 11/1999 | Nimri et al. |
| 6,043,909 A | | 3/2000 | Holub |

FOREIGN PATENT DOCUMENTS

| | | |
|---|---|---|
| JP | 09-312777 | 12/1997 |
| JP | 11-331622 | 11/1999 |
| WO | WO 99/41734 | 8/1999 |

OTHER PUBLICATIONS

IEC TC100 sRGB Draft Standard.

R. S. Gentile, E. Walowit, and J. P. Allebach, "A comparison of techniques for color gamut mismatch compensation," J. Imaging Technol. 16, 176–181 (1990).

Lindley, Craig A., "JPEG–like Image Compression, part 1: Here's a C++ Class Library for JPEG–like Image Compression", Dr. Dobbs Journal, v. 20, n. 7, pp. 50–59, Jul. 1995.

(List continued on next page.)

Primary Examiner—Leo Boudreau
Assistant Examiner—Ali Bayat
(74) Attorney, Agent, or Firm—Raymond L. Owens

(57) ABSTRACT

A method for representing a digital image having color values with an extended color gamut in a storage color space having a limited color gamut including providing a color adjustment function; adjusting the color values of the extended color gamut digital image to fit within the limited color gamut to form a limited color gamut digital image using the color adjustment function; representing the limited color gamut digital image in the storage color space; and associating information about the color adjustment function with the limited color gamut digital image in the storage color space such that the associated information and the limited color gamut digital image are adapted to produce a reconstructed extended color gamut digital image.

32 Claims, 3 Drawing Sheets

OTHER PUBLICATIONS

English Language Translation of Claim 1 of Japanese Printed Patent Application No. 9–312777 (Kojima Misaki et al.), of Dec. 2, 1997, as translated by the Japanese Patent Office, p. 1.

Abrash, Michael, "Zen of Graphics Programming with Disk", IDG Books Worldwide, as reprinted from Dr. Dobbs (TM) Graphics Books on CD–ROM, "Notes Before We Begin", reprinted as p. 1.

Stroebel, Leslie et al., ed., "Encyclopedia of Photography", Boston: Focal Press, ISBN 0–240–80059–1, p. 113.

English Language Translation selected passage of Japanese Printed Patent Application No. 11–331622 (Okubo Akihito) of Nov. 30, 1999, as translated by the Japanese Patent Office, pp. 1–9.

U.S. application No. 09/162,026, McCarthy et al., filed Sep. 28, 1998.

U.S. application No. 09/162,234, Spaulding et al., filed Sep. 28, 1998.

U.S. application No. 09/162,201, McCarthy et al., filed Sep. 28, 1998.

U.S. application No. 09/162,205, McCarthy et al., filed Sep. 28, 1998.

U.S. application No. 09/489,367, Spaulding et al., filed Jan. 21, 2000.

U.S. application No. 09/354,808, Parada et al., filed Jul. 16, 1999.

U.S. application No. 09/543652, Spaulding et al. filed Apr. 5, 2000.

U.S. application No. 09/543,038, Spaulding et al., filed Apr. 5, 2000.

U.S. application No. 09/651,510, Spaulding et al., filed Aug. 30, 2000.

U.S. application No. 09/716,107, Spaulding et al., filed Nov. 17, 2000.

* cited by examiner

REPRESENTING AN EXTENDED COLOR GAMUT DIGITAL IMAGE IN A LIMITED COLOR GAMUT COLOR SPACE

CROSS REFERENCE TO RELATED APPLICATIONS

Reference is made to commonly assigned U.S. patent application Ser. No. 09/162,205 filed Sep. 28, 1998, entitled "Using a Set of Residual Images to Represent an Extended Color Gamut Digital Image" to McCarthy et al; U.S. patent application Ser. No. 09/162,026, filed Sep.28, 1998, entitled "Using a Residual Image to Repiesent an Extended Color Gamut Digital Image" to McCarthy et al; U.S. patent application Ser. No. 09/162,234, filed Sep. 28, 1998, entitled "Method of Applying Manipulation to an Extended Color Gamut Digital Image" to Spaulding et al; and U.S. patent application Ser. No. 09/162,201, filed Sep. 28, 1998, entitled "A System Using One or More Residual Image(s) to Represent an Extended Color Gamut Digital Image" to McCarthy et al, the disclosures of which are incorporated herein by reference.

FIELD OF THE INVENTION

The present invention relates to the field of digital imaging, and more particularly to representing an extended color gamut digital image.

BACKGROUND OF THE INVENTION

In digital imaging systems, there are many ways to represent images in digital form. Not only are there many different formats of digital files, but there are also a large variety of different color spaces and color encodings that can be used to specify the color of digital images.

In some cases, the color encoding can be in terms of a so-called device independent color space, such as the well-known CIELAB color space. In recent years this color space has been used extensively to specify the color of digital images in color-managed digital imaging systems. In some cases, the image may actually be stored in the CIELAB color space. More commonly, the color space can be used to connect device profiles, which can be used to describe the color characteristics of various color imaging devices such as scanners, printers, and CRT video displays. The KODAK Photo YCC Color Interchange Space is another example of a device independent color space that can be used to encode digital images.

In other cases, the color-encoding can be in terms of a device dependent color space. Video RGB color spaces and CMYK color spaces are examples of this type. When a color image is encoded in a device dependent color space, it will have the desired color appearance when it is displayed on the particular output device associated with that color space. The advantage of a device dependent color space is that the image is ready to be displayed or printed on the target device. However, the disadvantage is that the image will necessarily be limited to the color gamut of the target device. Therefore, if the target device has a limited dynamic range, or is incapable of reproducing certain saturated colors, then it is not possible to encode color values outside of the range of colors that can be produced on the device.

One type of device dependent color space that has become quite widespread for use as a storage and manipulation color space for digital images is the video RGB color space. In reality, there are many different video RGB color spaces due to the fact that there are many different types of video RGB displays. As a result, a particular set of video RGB color values will correspond to one color on one video display and to another color on another video display. Therefore, video RGB has historically been a somewhat ambiguous color representation due to the fact that the color values could not be properly interpreted unless the characteristics of the target video display were known. Nonetheless, video RGB color spaces have become the defacto standard in many applications because the creation, display and editing of images on video displays are central steps in many digital imaging systems.

Recently, there have been efforts to standardize a particular video RGB color space in order to remove the ambiguity in the interpretation of the color values. One such proposed standard color space is known as "sRGB." (See the proposed IEC TC100 sRGB Draft Standard). This color space specifies a particular set of red, green, and blue primaries, a particular whitepoint, and a particular non-linear code value to light intensity relationship. Together, these tightly define the overall relationship between the digital code values and the corresponding device independent color values.

Although the use of a standard video RGB color space eliminates much of the ambiguity usually associated with video RGB color spaces, it does nothing to address the fact that this color space has a limited color gamut relative to other output devices. Additionally, any output device will have a limited color gamut relative to that of an original scene. For example, a scene can have a luminance dynamic range of 1000:1 or more, whereas a typical video display or reflection print will have a dynamic range on the order of 100:1. Certain image capture devices, such as photographic negative film, can actually record dynamic ranges as large as 8000:1. Even though this is larger than the luminance dynamic range associated with most scenes, the extra dynamic range is often useful to provide allowance for exposure errors, light source variations, etc.

In order to encode images from various sources in a video RGB representation, it is necessary to discard information that is outside the color gamut of the video RGB color space. In some cases, such as when it is desired to encode the appearance of colors in an original scene or the colors captured by a photographic negative, a great deal of information will typically need to be discarded due to the large disparity in the dynamic ranges. For the case where it is desired to scan a reflection print and store it in a video RGB color space, it is still necessary to discard a substantial amount of information due to the mismatch in the color gamuts, even though the luminance dynamic ranges may be quite similar.

For example, FIG. 1 shows a comparison of a typical Video RGB Color Gamut 10 and a typical Reflection Print Color Gamut 12. In this case, a*–b* cross-sections of the color gamuts are shown in the CIELAB space at an L* of 65. The colors that are inside the boundary are within the gamuts of the respective devices, while those that are outside the boundary cannot be reproduced, and are therefore referred to as "out-of-gamut" colors. It can be seen that there is a large set of color values with a b* value larger than 60 that can be produced on the printer, but are outside the color gamut of the video display. As a result, if the reflection print were scanned and stored in a video RGB color space, it would not be possible to encode this color information.

The mismatch between the video RGB color gamut and the color gamuts of other output devices and image sources represents a serious limitation on the usefulness of the video RGB color space. However, in many cases, the convenience of storing the image in a color space that is ready for direct display on a computer video CRT has been the over-riding factor in the determination of the preferred color space. This has come at the expense of applications that can utilize the extended color gamut information that may have existed in an input image.

SUMMARY OF THE INVENTION

It is an object of the present invention to overcome the limitations of the prior art by permitting the storage of images in a color space having a limited color gamut, while retaining the extended color gamut information.

This object is achieved by a method for representing a digital image having color values with an extended color gamut in a storage color space having a limited color gamut comprising the steps of:

a) providing a color adjustment function;

b) adjusting the color values of the extended color gamut digital image to fit within the limited color gamut to form a limited color gamut digital image using the color adjustment function;

c) representing the limited color gamut digital image in the storage color space; and d) associating information about the color adjustment function with the limited color gamut digital image in the storage color space such that the associated information and the limited color gamut digital image are adapted to produce a reconstructed extended color gamut digital image.

ADVANTAGES

The present invention has the advantage that a digital image can be stored in a color space convenient for a particular application while overcoming the color gamut limitation associated with that color space.

As a result of the present invention, the image can be stored in a video RGB color space that is well adapted for fast and convenient display on a computer system without compromising the potential applicability of the image for other uses.

It has the additional advantage that the use of the extended color gamut information is optional. Therefore, the benefits of the extended color gamut information can be gained by applications that are able to make use of it, without introducing an image quality or computation penalty for applications that do not require the optional information or that are not able to make use of it.

DETAILED DESCRIPTION OF THE INVENTION

Figure 2:
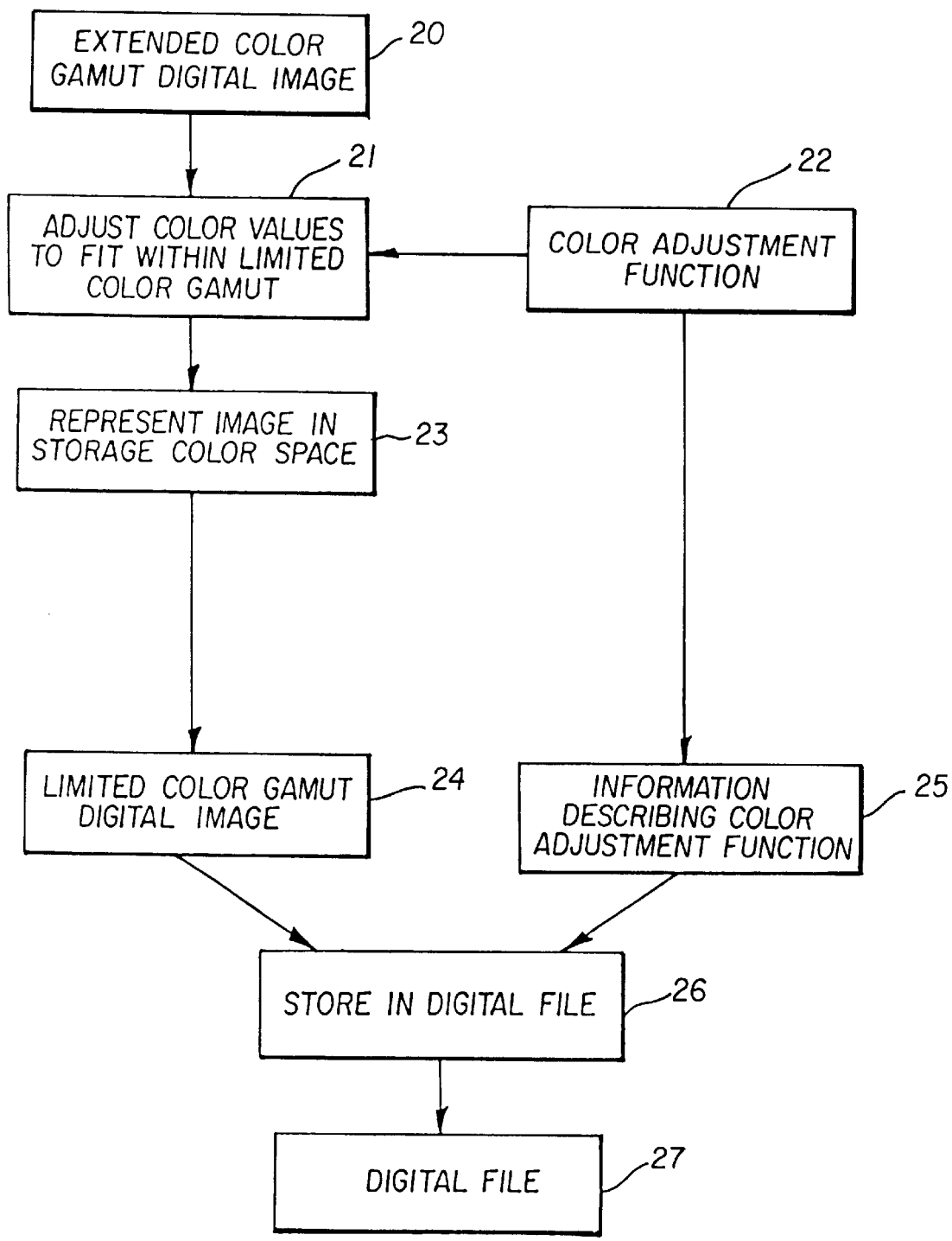
FIG. 2 is a flowchart showing the process of making a limited gamut digital image in accordance with the present invention.

One preferred embodiment of the present invention is shown in FIG. 2. An extended color gamut digital image 20 has color values that are outside the limited color gamut of a storage color space. An adjust color values step 21 is used to limit the color values to those that will fit within the limited color gamut of the storage color space using a color adjustment function 22. Next, a represent image in storage color space step 23 is used to form a limited color gamut digital image 24. The limited color gamut digital image 24 is then associated with the information describing the color adjustment function 25 and stored in a digital file 27 using a digital file storage step 26.

Each of the aspects of the invention shown in FIG. 2 will now be discussed in more detail. The extended color gamut digital image 20 can take many different forms. For example, the image could be a scanned photograph, a scanned photographic negative, a scanned photographic transparency, or an image from a digital camera, etc. Depending on the source of the image, as well as any image processing that has been applied to the image, the image can have very different color gamuts, and color representations.

The color gamut of an imaging system is the range of colors that can be represented or produced. Since color is fundamentally a three-dimensional phenomenon, color gamuts can be viewed as a three-dimensional volume. Color values that are within the volume are said to be "in gamut," whereas colors that are outside the volume are said to be "out of gamut." One aspect of the color gamut is the luminance dynamic range of the system. This is the range of relative luminance values that can be encoded by the system from the whitest white to the blackest black. Another aspect of the color gamut is the range of chroma values that can be represented from a neutral gray out to a saturated color. The range of chroma values that are in gamut will generally be a function of hue and lightness. Generally, the highest chroma colors can be produced near the hue and lightness of the primary and secondary colors of a given imaging device or color space (usually red, green, blue, cyan, magenta and yellow).

If the image were a scanned photograph, the potential color gamut of the image would generally be the color gamut of the original photographic print medium. Likewise if the image were captured by a digital camera, the potential color gamut of the image would generally be that of an original scene, although it may be limited by the dynamic range of the camera sensor and by lens flare. Generally, the color space chosen to represent the image can be independent of the color gamut of the original image. For example, the color values for a scanned photograph can be represented as raw scanner code values, or they can be given by device independent color values according to a color space such as the well-known CIELAB color space. Alternatively, the color values can be expressed in some other color space.

Figure 1:
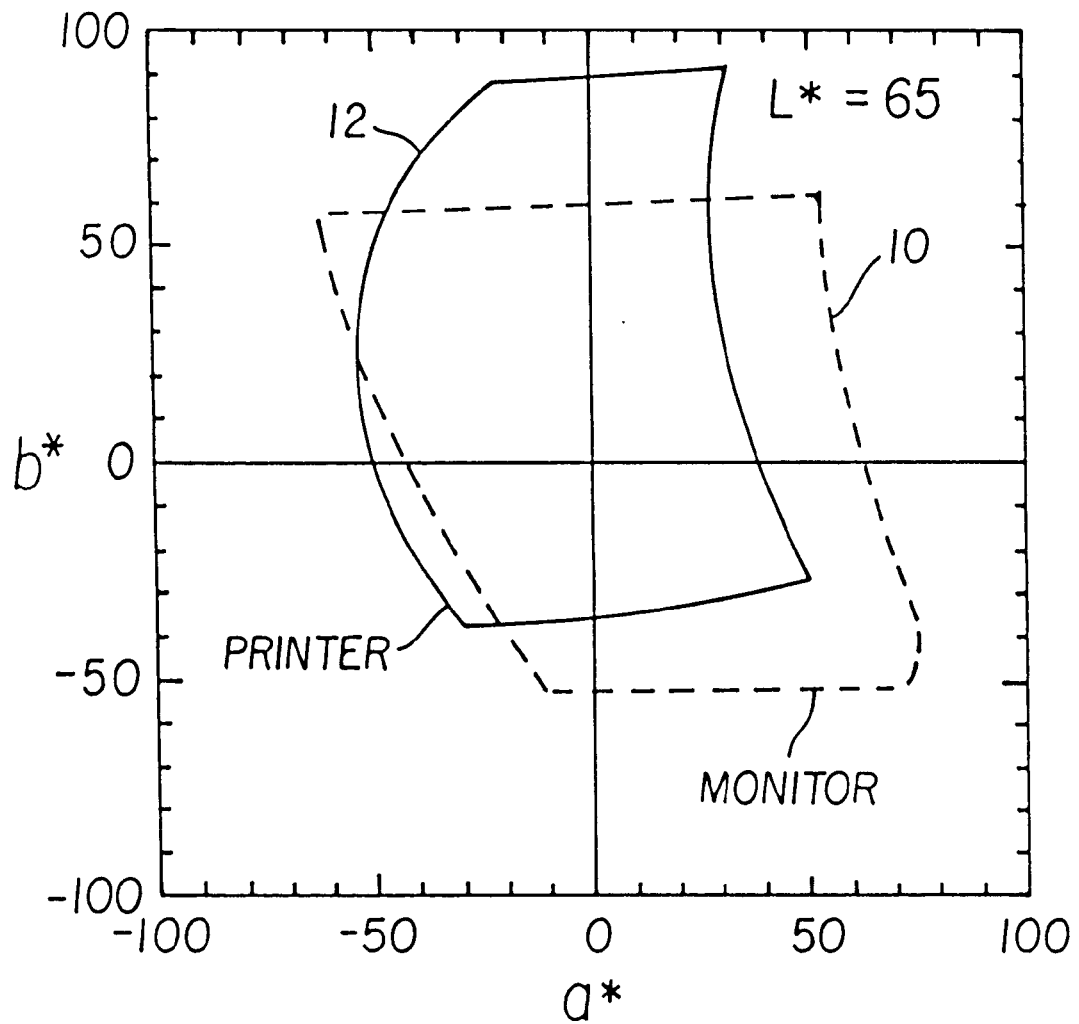
FIG. 1 is graph comparing the color gamuts of a typical video display, and a typical reflection print.

For many applications, it is convenient to store, display and manipulate the digital image in a particular storage color space that is well-suited for the work flow associated with that application. Frequently, the storage color space that is chosen will be a device dependent color space associated with a common output device or medium used by the system. In many cases, video RGB color spaces are used because they can be displayed or previewed directly on a computer video display without any further processing. Additionally, many software applications that are available to manipulate images on a computer are designed to work with images in a video RGB color space. The color gamut of the storage color space will often be smaller than, or at least different from, the original color gamut of the extended color gamut digital image 20. As a result, there generally will be colors in the extended color gamut digital image 20 that can not be represented in the storage color space. For example, consider the case where the extended color gamut digital image 20 is a scanned photographic print. There are many colors within the color gamut of the reflection print that are outside the color gamut of the video RGB color space. This can clearly be seen in FIG. 1, which shows cross-sections through a typical video RGB color gamut 10, and a typical reflection print color gamut 12.

Therefore, color values for the out-of-gamut colors must somehow be modified in order to store the reflection print color values in a video RGB color space or any other limited color gamut storage space. The required modification is even more severe for cases where the extended color gamut digital images comes from sources such as a digital camera, or the scan of a photographic negative, where there is a large amount of extended luminance dynamic range information in addition to extended chroma information. In prior art methods, there is no way to recover the original extended gamut digital image color values. In the present invention, the original extended gamut digital image color values can be reconstructed by making use of information describing the color adjustment function that was used to form the limited color gamut digital image.

The adjust color values step 21 is used to adjust the color values of the extended color gamut digital image to fit within the limited color gamut of the storage space, forming adjusted color values. In this step, out-of-gamut colors in the extended color gamut digital image must be must be modified so that color values that are outside the limited color gamut are mapped to color values within the limited color gamut. In order for this invention to be applied most successfully, it is desirable that the color adjustment function that is used be substantially invertible. In practice, this means that, to whatever extent possible, the situation should be avoided where many extended color gamut color values map to the same adjusted color value. This implies that a gamut-compression strategy should be used, as opposed to a gamut-clipping strategy where the color values for the out-of-gamut colors are simply mapped onto the surface of the limited color gamut. Gamut-compression strategies involve using more sophisticated gamut-mapping methods to compress the extended color gamut into the limited color gamut without introducing a hard clipping function.

There are many different types of gamut-compression strategies, ranging from quite simple to very complex. For example, chroma values of the input color values can simply be scaled so that the most saturated colors in the extended color gamut are mapped to the most saturated colors in the limited color gamut. Alternatively, more sophisticated strategies can be used that would compress the high-chroma colors, while leaving the low-chroma color unchanged. Examples of gamut mapping strategies that could be used are found in U.S. Pat. Nos. 5,539,540 and 5,583,666.

In some cases, the extended color gamut can have a larger luminance dynamic range than can be represented in the limited color gamut. In this case, one aspect of the implementation of the adjust color values step 21 is typically the application of a tone scale adjustment function. The tone scale function might be applied to a luminance channel of the image, or alternatively to each color channel of an RGB color representation. In some applications, the image being processed can actually be a monochrome image, e.g., a grayscale image. In this case, the tonescale function can be applied to the grayscale image values.

For cases where the extended color gamut digital image is a representation of the colors in an original scene, the adjust color values step 21 will typically involve determining rendered color values that will produce desired aim colors on a target output device. For example, optimal tone and color reproduction aims can be applied to determine desired video RGB aim colors for the original scene colors. The process of transforming the original scene color values into rendered color values is sometimes referred to as "rendering" the image.

Another type of color adjustment function 22 involves encoding the image in terms of a different set of primaries than those normally associated with the storage color space. For example, if the storage space is a video RGB color space, then the color encoding will be associated with the color values of the red, green, and blue primaries of the video system. These color values are associated with the colors of the phosphors of the video display. If a different set of primaries were used that had higher chroma values, a larger portion of the extended color gamut can be encoded. This type of color adjustment function would have the effect of compressing the chroma values of the image.

For specific examples of color adjustment functions that can be used to create a limited color gamut digital image see R. S. Gentile, E. Walowit, and J. P. Allebach, "A comparison of techniques for color gamut mismatch compensation," J. Imaging Technol. 16, 176–181 (1990). Additional information is available in U.S. Pat. Nos. 5,539,540 to Spaulding et al, and U.S. Pat. No. 5,583,666 to Ellson et al.

The color adjustment function 22 can be implemented in many different ways. In some cases, it might be applied using a set of simple mathematical transformations such as scale factors, etc. In other cases it might be implemented with a polynomial function, a set of one-dimensional look-up tables, or a multi-dimensional look-up tables, etc, or a combination thereof. The exact implementation that is used for a particular application will depend on the type of color adjustment function, as well as the computation capabilities of the image processing system.

Once the adjusted color values have been determined, the next step is to represent the adjusted color values in the storage color space using the represent image in storage color space step 23. The output of this step is a limited color gamut digital image 24. This step typically involves applying a device model, or a color space conversion to determine the storage space color values that correspond to the adjusted color values. For example, if the adjusted color values were specified in terms of the CIELAB color space, a video display model can be used to determine the corresponding video RGB values that would be necessary to produce the specified adjusted color values.

As discussed above, the process of applying the color adjustment function to the extended color gamut digital image has the effect of changing the color values for the out-of-gamut colors, as well as some or all of the in-gamut colors. Although this process might produce an image which is well-suited to the particular limited color gamut storage color space, there are many applications where there would be an advantage to knowing the original extended color gamut digital image color values. For example, if the image is to be printed on an output device other than some default device that might be associated with the storage color space, or if it is necessary to modify the image data in any way. By the method of the present invention the original extended color gamut digital image can be reconstructed in order to enable these applications.

The key to being able to reconstruct the original extended color gamut digital image from the limited color gamut digital image is a knowledge of the color adjustment function 22 that was used to modify the image. Due to the fact that there are many different ways to adjust the extended color gamut digital image to fit within the limited color gamut, there is usually no way to know what color adjustment function was used. The present invention addresses this problem by storing information describing the color adjustment function 25 together with the limited color gamut digital image 24. The resulting digital file 27 will therefore contain information that is required to reconstruct the original extended color gamut digital image.

There are many different types of information that can be used to describe the color adjustment function 22. For example, a multi-dimensional look-up table can be used to describe the color adjustment function. In this case, the nodes of the multi-dimensional look-up table would store the adjusted limited color gamut color values for a lattice of original extended color gamut color values. Conversely, the multi-dimensional look-up table can be used to store the inverse transformation. In this case, the nodes of the multi-dimensional look-up table would store the original extended color gamut color values for a lattice of limited color gamut color values.

In some cases, the color adjustment function 22 can be described adequately by a one-dimensional look-up table. For example, if the color adjustment function involves the application of a tonescale function to the extended color gamut digital image, a look-up table can be stored that describes the tonescale function. As before, either a forward or an inverse version of the color adjustment function can be stored.

In some cases, the color adjustment function 22 can be described by a set of parameters. For example, the parameters might include a set of color-correction matrix coefficients. In some cases, a polynomial model can be used to describe even relatively complex color adjustment functions. The color adjustment function can then be described by the set of polynomial coefficients.

For some applications, there can be a limited number of standard color adjustment functions that can be used. In this case, rather than storing the actual color adjustment function, it might be preferable to simply store an identifier to indicate which color adjustment from the set of standard color adjustment functions was used. Any system that wished and had a knowledge of the set of standard color adjustment functions would then be able to produce the reconstructed extended color gamut digital image.

Once the information describing the color adjustment function 25 has been identified, it should be associated in some fashion with the limited color gamut digital image 24. This can involve storing the information describing the color adjustment function 25 in a memory buffer that is associated with a second memory buffer used to store the limited color gamut digital image 24. Alternatively, many applications will store the image data in a digital file 27 on some sort of digital storage media such as a magnetic disk, an optical disk, or a PCMCIA card using a digital file storage step 26. The limited color gamut digital image 24 and the information describing the color adjustment function 25 can be stored in two different files, or can be stored in the same digital image file. In many cases, the file format used to store the limited color gamut digital image 24 may support the use of private data tags. For example, the file formats TIFF, EXIF and FlashPIX all support tags of this sort. These tags are sometimes referred to as meta-data. In cases where file formats of this type are used, it will be convenient to store the information describing the color adjustment function 25 in the form of a color adjustment function tag. In this way, applications that do not know how to make use of the color adjustment function tag will simply ignore it, and will therefore only have access to the limited color gamut digital image 24. Whereas applications that know how to use the color adjustment function tag will be able to make use of it to reconstruct the extended color gamut digital image. Some file formats place a limit on the size of tags, so compression of the color adjustment function information might be necessary for these cases.

The result of applying the method of the present invention is the creation of a limited color gamut digital image in a storage color space, which is stored together with information describing the color adjustment function which correlates it to an extended color gamut digital image. As discussed above, the limited color gamut digital image is generally well suited for display on a target output device such as a video display. One advantage of this approach, is that systems which do not know how to make use of the information describing the color adjustment function, will be able to display, and manipulate this image directly with no image quality or computation disadvantage relative to the prior art where only the limited color gamut digital image is stored. However, the information that can be used to reconstruct the original extended color gamut digital image has now been stored with the limited color gamut digital image and is available for use by systems that know what to do with it. In this case, the limited color gamut digital image is extracted and the information describing the color adjustment function is used to form a reconstructed extended color gamut digital image.

Figure 3:
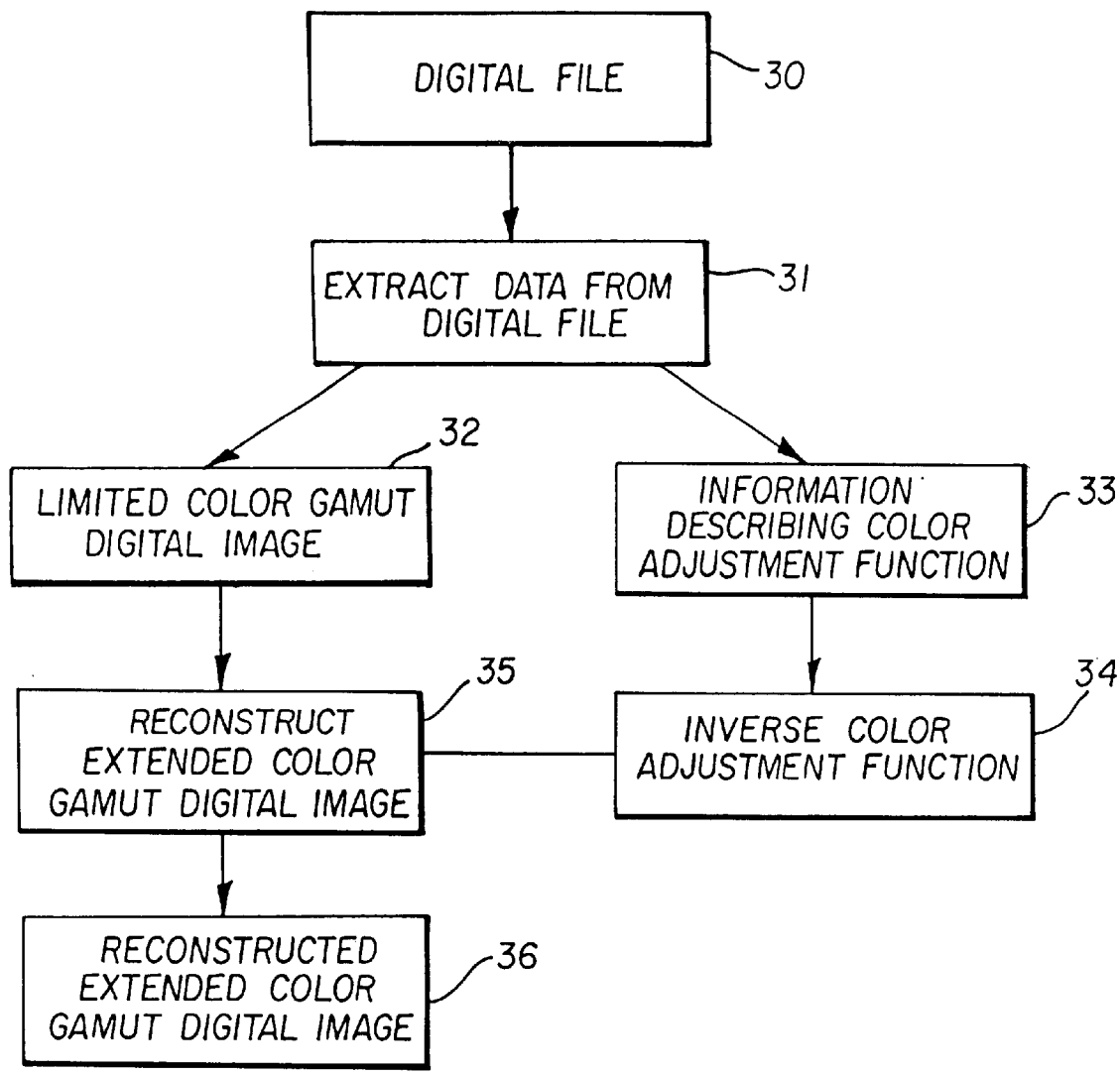
FIG. 3 is a flowchart showing the reconstruction of a extended gamut digital image from the limited digital image of FIG. 2.

FIG. 3 shows an example of reconstructing an extended color gamut digital image from the limited color gamut digital image using the information describing the color adjustment function. The input to this process is a digital file 30 created using the method of the present invention as described above. An extract data from digital file step 31 is used to extract the limited color gamut digital image 32 and the information describing the color adjustment function 33. The information describing the color adjustment function 33 is then used to determine an inverse color adjustment function 34. A reconstruct extended color gamut digital image step 35 is then used to form a reconstructed extended color gamut digital image 36 from the limited color gamut digital image 32 and the inverse color adjustment function 34.

The reconstructed extended color gamut digital image can be used for many different purposes. For example, it can be used to form a digital image appropriate for display on an output device having a color gamut different than the limited color gamut. This enables the generation of an optimal print from the reconstructed extended color gamut digital image, rather than trying to make use of the image which was optimized for the storage color space.

Alternatively, the information in the reconstructed extended color gamut digital image can be used during the process of applying a modification to the digital image. For example, consider the case where the original image is determined to be over-exposed. In this case, the highlights of the limited color gamut digital image would have been greatly compressed during the adjust color values step. However, the highlight information would be restored in the reconstructed extended color gamut digital image. This information can then be used to produce a modified digital image which retains the highlight detail. Modifications to the digital image can be interactively user specified, such as in the case of a user adjustable brightness knob. Modifications can also be determined by applying an automatic algorithm to the digital image. For example, a "scene balance algorithm" can be used to estimate the best color balance and brightness level for an image.

In some cases, it will be desirable to send the modified digital image directly to a printer, but in other cases, it may be desirable to write the modified image back out to a file. In this case, a new limited color gamut digital image can be determined, and information about the color adjustment function can again be stored with the new limited color gamut digital image. The color adjustment function applied in this case might be the same color adjustment function that was used originally, or alternatively, it can be a new color adjustment function.

A computer program product having a computer readable storage medium can have a computer program stored thereon for performing all the steps of the present invention. The computer readable storage medium can comprise, for example; magnetic storage media such as magnetic disc (such as a floppy disc) or magnetic tape; optical storage media such as optical disk, optical tape, or machine readable bar code; solid state electronic storage devices such as random access memory (RAM), or read only memory (ROM); or any other physical device or medium employed to store a computer program.

The invention has been described in detail with particular reference to certain preferred embodiments thereof, but it will be understood that variations and modifications can be effected within the spirit and scope of the invention.

PARTS LIST 10 color gamut for video RGB display
12 color gamut for reflection print
20 extended color gamut digital image
21 adjust color values
22 color adjustment function
23 represent image in storage color space
24 limited color gamut digital image
25 information describing the color adjustment function
26 digital file storage
27 digital file
30 digital file
31 extract digital file data
32 limited color gamut digital image
33 information describing the color adjustment function
34 inverse color adjustment function
35 reconstruct extended color gamut digital image
36 reconstructed extended color gamut digital image

What is claimed is:

1. A method for representing a digital image having color values with an extended color gamut in a storage color space having a limited color gamut comprising:
    a) providing a color adjustment function that can be used to adjust the color values of an extended color gamut digital image to fit within the limited color gamut the color adjustment function comprising a difference between the extended color gamut digital image and a limited color gamut digital image fitting within the limited color gamut;
    b) adjusting the color values of the extended color gamut digital image to fit within the limited color gamut to form the limited color gamut digital image using the color adjustment function;
    c) representing the limited color gamut digital image in the storage color space; and
    d) storing information about the color adjustment function with the limited color gamut digital image in the storage color space such that the associated information and the limited color gamut digital image are adapted to be used to produce a reconstructed extended color gamut digital image.

2. The method of claim 1 where the storage color space is a particular device dependent color space.

3. The method of claim 2 where the storage color space is a video RGB color space.

4. The method of claim 3 further including previewing the digital image by displaying the limited color gamut digital image on a video display.

5. The method of claim 1 where the storage color space is a particular limited color gamut color space.

6. The method of claim 1 where the information about the color adjustment function includes a multi-dimensional look-up table describing the color adjustment function.

7. The method of claim 1 where the information about the color adjustment function includes a one-dimensional look-up table describing the color adjustment function.

8. The method of claim 1 where the information about the color adjustment function is provided by a set of parameters describing the color adjustment function.

9. The method of claim 1 where the information about the color adjustment function is an identifier to indicate which color adjustment function from a set of standard color adjustment functions was used.

10. The method of claim 1 where the extended color gamut digital image has a larger range of chroma values than the limited color gamut digital image.

11. The method of claim 1 where the extended color gamut digital image has a larger dynamic range than the limited color gamut digital image.

12. The method of claim 11 where the adjusting the color values of the extended color gamut digital image to form the limited color gamut digital image includes applying a tone scale function to reduce the dynamic range of the image.

13. The method of claim 12 where the extended dynamic range digital image is a monochrome digital image.

14. The method of claim 1 where the extended color gamut digital image represents the colors in an original scene.

15. The method of claim 14 where the limited color gamut digital image is formed by rendering the colors of the original scene to produce rendered color values that are desirable for a particular output device.

16. The method of claim 1 where the extended color gamut digital image originates from a scan of a photographic negative.

17. The method of claim 1 where the extended color gamut digital image originates from a scan of a photographic transparency.

18. The method of claim 1 where the extended color gamut digital image originates from a scan of a photographic print.

19. The method of claim 1 where the extended color gamut digital image originates from a digital camera.

20. The method of claim 1 where the limited color gamut digital image is stored in a digital image file using a digital storage medium.

21. The method of claim 20 where the information about the color adjustment function is stored as additional data in the digital image file.

22. The method of claim 20 where the limited color gamut digital image is stored in the digital image file, and where the information about the color adjustment function is stored in a separate associated digital image file.

23. The method of claim 1 further including using the information about the color adjustment function together with the limited color gamut digital image to produce a digital image appropriate for display on an output device having a color gamut different that the limited color gamut.

24. The method of claim 1 where the color adjustment function is approximately invertible.

25. The method of claim 1 further including the step of using the information about the color adjustment function together with the limited color gamut digital image to produce a reconstructed extended color gamut digital image.

26. A method for representing and manipulating a digital image with an extended color gamut using a storage color space having a limited color gamut comprising:
 a) providing a color adjustment function that can be used to adjust the color values of an extended color gamut digital image to fit within the limited color gamut the color adjustment function comprising a difference between the extended color gamut digital image and a limited color gamut digital image fitting within the limited color gamut;
 b) adjusting the color values of the extended color gamut digital image to fit within the limited color gamut to form the limited color gamut digital image using a color adjustment function;
 c) representing the limited color gamut digital image in the storage color space;
 d) storing information about the color adjustment function with the limited color gamut digital image in the storage color space such that the associated information and the limited color gamut digital image are adapted to be used to produce a reconstructed extended color gamut digital image;
 e) specifying a desirable modification to the image; and
 f) using the information about the color adjustment function together with the limited color gamut digital image and the specified desirable modification to the image to produce a modified digital image.

27. The method of claim 26 where the desirable modification is interactively user specified.

28. The method of claim 26 where the desirable modification is determined by applying an automatic algorithm to the digital image.

29. The method of claim 26 where a new limited color gamut digital image is formed for the modified digital image.

30. A computer program product for representing a digital image having color values with an extended color gamut in a storage color space having a limited color gamut comprising a computer readable storage medium having a computer program stored thereon for performing:
 a) providing a color adjustment function that can be used to adjust the color values of an extended color gamut digital image to fit within the limited color gamut the color adjustment function comprising a difference between the extended color gamut digital image and a limited color gamut digital image fitting within the limited color gamut;
 b) adjusting the color values of the extended color gamut digital image to fit within the limited color gamut to form a limited color gamut digital image using the color adjustment function;
 c) representing the limited color gamut digital image in the storage color space; and
 d) storing information about the color adjustment function with the limited color gamut digital image in the storage color space such that the associated information and the limited color gamut digital image are adapted to be used to produce a reconstructed extended color gamut digital image.

31. A computer program product for representing and manipulating a digital image with an extended color gamut using a storage color space having a limited color gamut comprising computer readable storage medium having a computer program stored thereon for performing:
 a) providing a color adjustment function that can be used to adjust the color values of an extended color gamut digital image to fit within the limited color gamut the color adjustment function comprising a difference between the extended color gamut digital image and a limited color gamut digital image fitting within the limited color gamut;
 b) adjusting the color values of the extended color gamut digital image to fit within the limited color gamut to form a limited color gamut digital image using a color adjustment function;
 c) representing the limited color gamut digital image in the storage color space;
 d) storing information about the color adjustment function with the limited color gamut digital image in the storage color space such that the associated information and the limited color gamut digital image are adapted to be used to produce a reconstructed extended color gamut digital image;
 e) specifying a desirable modification to the image; and
 f) using the information about the color adjustment function together with the limited color gamut digital image and the specified desirable modification to the image to produce a modified digital image.

32. A computer program product for representing and manipulating a digital image with an extended color gamut using a storage color space having a limited color gamut comprising computer readable storage medium having a computer program stored thereon for performing the steps of:
 a) providing a color adjustment function that can be used to adjust the color values of the extended color gamut digital image to fit within the limited color gamut;
 b) adjusting the color values of the extended color gamut digital image to fit within the limited color gamut to form a limited color gamut digital image using a color adjustment function;
 c) representing the limited color gamut digital image in the storage color space;
 d) associating information about the color adjustment function with the limited color gamut digital image in the storage color space such that the associated information and the limited color gamut digital image are adapted to be used to produce a reconstructed extended color gamut digital image;
 e) specifying a desirable modification to the image; and
 f) using the information about the color adjustment function together with the limited color gamut digital image and the specified desirable modification to the image to produce a modified digital image.

* * * * *